(12) United States Patent
Jawahir et al.

(10) Patent No.: US 11,651,319 B2
(45) Date of Patent: May 16, 2023

(54) INNOVATIVE MANUFACTURING METHODS FOR NEXT-GENERATION PRODUCTS, PROCESSES, AND SYSTEMS

(71) Applicant: University of Kentucky Research Foundation, Lexington, KY (US)

(72) Inventors: Ibrahim S. Jawahir, Lexington, KY (US); Ryan Bradley, Seattle, WA (US)

(73) Assignee: University of Kentucky Research Foundation, Lexington, KY (US)

( * ) Notice: Subject to any disclaimer, the term of this patent is extended or adjusted under 35 U.S.C. 154(b) by 230 days.

(21) Appl. No.: 16/998,366

(22) Filed: Aug. 20, 2020

(65) Prior Publication Data

US 2021/0056473 A1 Feb. 25, 2021

Related U.S. Application Data

(60) Provisional application No. 62/889,242, filed on Aug. 20, 2019.

(51) Int. Cl.
*G06Q 10/06* (2012.01)
*G06N 20/00* (2019.01)
(Continued)

(52) U.S. Cl.
CPC .......... *G06Q 10/067* (2013.01); *G06N 20/00* (2019.01); *G06Q 10/06312* (2013.01);
(Continued)

(58) Field of Classification Search
None
See application file for complete search history.

(56) References Cited

U.S. PATENT DOCUMENTS

| 5,918,053 A * | 6/1999 | Graham | G06F 11/323 |
| | | | 714/E11.181 |
| 6,199,198 B1 * | 3/2001 | Graham | G06F 11/3664 |
| | | | 714/E11.217 |

(Continued)

FOREIGN PATENT DOCUMENTS

| CN | 109559016 A | * | 4/2019 |
| CN | 109784686 A | * | 5/2019 |
| JP | 2004185251 A | * | 7/2004 |

OTHER PUBLICATIONS

Mohamad M. Khasreen, "Life-Cycle Assessment and the Environmental Impact of Buildings: A Review", Aug. 13, 2009, Environmental Sustainability and the Built Environment, pp. 674-701. (Year: 2009).*

(Continued)

*Primary Examiner* — Tan D Nguyen
(74) *Attorney, Agent, or Firm* — Stites & Harbison PLLC; Patrick M. Torre (57) ABSTRACT

A method for managing a modular product life cycle is described. A central computing device or system receives inputs representative of one or more of: an expected product life cycle, a market demand for the product, a manufacturing process for the product, a reverse manufacturing process for the product, and one or more technical engineering constraints associated with the product. From this information, a first modular product design is determined. Later in the life cycle of the modular product a second plurality of inputs representative of one or more of: a market demand, a manufacturing process, a reverse manufacturing process, and one or more technical engineering constraints are retrieved. From this information, a second modular product design is determined.

20 Claims, 10 Drawing Sheets

(51) Int. Cl.
*G06Q 30/02* (2012.01)
*G06Q 50/04* (2012.01)
*G06Q 10/00* (2012.01)
*G06Q 10/067* (2023.01)
*G06Q 10/0631* (2023.01)
*G06Q 30/0202* (2023.01)
*G06Q 10/30* (2023.01)

(52) U.S. Cl.
CPC ......... *G06Q 30/0202* (2013.01); *G06Q 10/30* (2013.01); *G06Q 50/04* (2013.01)

(56) References Cited

U.S. PATENT DOCUMENTS

| | | |
|---|---|---|
| 6,246,919 B1 | 6/2001 | Hassel |
| 6,321,983 B1 | 11/2001 | Katayanagi et al. |
| 6,490,569 B1 | 12/2002 | Grune et al. |
| 6,701,257 B2 | 3/2004 | Sakurai et al. |
| 6,811,344 B1 | 11/2004 | Kobayashi et al. |
| 6,816,792 B2 | 11/2004 | Sakurai et al. |
| 6,965,833 B2 | 11/2005 | Sakurai et al. |
| 7,054,797 B2 | 5/2006 | Kobayashi et al. |
| 7,117,117 B2 | 10/2006 | Sakurai et al. |
| 7,219,042 B2 | 5/2007 | Kobayashi et al. |
| 7,266,482 B2 | 9/2007 | Kobayashi et al. |
| 7,340,351 B2 | 3/2008 | Oyasato et al. |
| 7,346,459 B2 | 3/2008 | Sakurai et al. |
| 7,353,118 B2 | 4/2008 | Sakurai et al. |
| 7,412,365 B2 | 8/2008 | Kobayashi et al. |
| 7,542,883 B2 | 6/2009 | Kumazawa et al. |
| 7,877,157 B2 | 1/2011 | Oyasato et al. |
| 9,286,577 B2 | 3/2016 | Shofner et al. |
| 10,009,351 B2 | 6/2018 | Choi |
| 2002/0030100 A1 | 3/2002 | Katayanagi et al. |
| 2002/0099587 A1 | 7/2002 | Kakihana et al. |
| 2005/0267781 A1 | 12/2005 | Kobayashi et al. |
| 2006/0010021 A1 | 1/2006 | Kobayashi et al. |
| 2008/0154749 A1 | 6/2008 | D'hooghe et al. |
| 2011/0238429 A1 | 3/2011 | Kawakita et al. |
| 2013/0018809 A1 | 1/2013 | Li et al. |
| 2014/0081583 A1* | 3/2014 | Kianpour ............ G06F 11/3409 702/34 |
| 2016/0042104 A1 | 2/2016 | Bernstein et al. |
| 2018/0260827 A1* | 9/2018 | Sullivan ................ G06N 3/084 |
| 2020/0334921 A1* | 10/2020 | Spes ........................ G06F 17/18 |

OTHER PUBLICATIONS

Michael Rubmann, "Industry 4.0: The Future of Productivity and Growth in Manufacturing Industries", Apr. 9, 2015, pp. 1-14. (Year: 2015).*

Yoon-Eui Nahm, "Integrated Product and Process Modeling for Collaborative Design Environment", Mar. 2004, Concurrent Engineering: Research and Applications, vol. 12, No. 1, pp. 5-23. (Year: 2004).*

* cited by examiner

Generic Data Structure of the Training Set

| | Design Feature 1 | Design Feature 2 | Design Feature 3 | ... | Design Feature N | SV | RC | TP |
|---|---|---|---|---|---|---|---|---|
| Product 1 | $x_{11}$ | $x_{12}$ | $x_{13}$ | ... | $x_{1n}$ | $y_{11}$ | $y_{12}$ | $y_{13}$ |
| Product 2 | $x_{21}$ | $x_{22}$ | $x_{23}$ | ... | $x_{2n}$ | $y_{21}$ | $y_{22}$ | $y_{23}$ |
| Product 3 | $x_{31}$ | $x_{32}$ | $x_{33}$ | ... | $x_{3n}$ | $y_{31}$ | $y_{32}$ | $y_{33}$ |
| ... | ... | ... | ... | ... | ... | ... | ... | ... |
| Product M | $x_{m1}$ | $x_{m2}$ | $x_{m3}$ | ... | $x_{mn}$ | $y_{n1}$ | $y_{n2}$ | $y_{n3}$ |

FIG. 9

HOPE – Designer, Model $$\text{predictor matrix, } A = \begin{vmatrix} 1 & x_{11} & x_{12} & \cdots & x_{1n} \\ 1 & x_{21} & x_{22} & \cdots & x_{2n} \\ 1 & x_{31} & x_{32} & \cdots & x_{3n} \\ \cdots & \cdots & \cdots & \cdots & \cdots \\ 1 & x_{m1} & x_{m2} & \cdots & x_{mn} \end{vmatrix}$$

$$\text{response matrix, } C = \begin{vmatrix} y_{11} & y_{12} & y_{13} \\ y_{21} & y_{22} & y_{23} \\ y_{31} & y_{32} & y_{33} \\ \cdots & \cdots & \cdots \\ y_{n1} & y_{n2} & y_{n3} \end{vmatrix}$$

$$\text{parameters matrix, } B = \begin{vmatrix} c_{01} & c_{02} & c_{03} \\ c_{11} & c_{12} & c_{13} \\ c_{21} & c_{22} & c_{23} \\ c_{31} & c_{32} & c_{33} \\ \cdots & \cdots & \cdots \\ c_{n1} & c_{n2} & c_{n3} \end{vmatrix}$$

$$\text{residuals matrix, } D = \begin{vmatrix} \sigma_{11} & \sigma_{12} & \sigma_{13} \\ \sigma_{21} & \sigma_{22} & \sigma_{23} \\ \sigma_{31} & \sigma_{32} & \sigma_{33} \\ \cdots & \cdots & \cdots \\ \sigma_{n1} & \sigma_{n2} & \sigma_{n3} \end{vmatrix}$$

$$B = (A'A)^{-1}A'C$$

$$SV = c_{01} + c_{11}X_1 + c_{21}X_2 \cdots c_{N1}X_3$$

$$RC = c_{02} + c_{12}X_1 + c_{22}X_2 \cdots c_{N2}X_3$$

$$TP = c_{03} + c_{13}X_1 + c_{23}X_2 \cdots c_{N3}X_3$$

INNOVATIVE MANUFACTURING METHODS FOR NEXT-GENERATION PRODUCTS, PROCESSES, AND SYSTEMS

RELATED APPLICATION

This application claims priority to U.S. Provisional Patent Application Ser. No. 62/889,242, filed on Aug. 20, 2019, the full disclosure of which is incorporated herein by reference.

TECHNICAL FIELD

At a high level, the present disclosure is directed to methods for manufacturing products according to a novel manufacturing methodology. By the disclosed methods and systems, manufacturing infrastructure is redesigned at the product, process, and system level. The disclosure further teaches leveraging Internet of Things (IoT) and associated data management infrastructure to disseminate information through all levels of an associated supply chain.

BACKGROUND

The current state-of-the-art in manufacturing is predominantly a one-way linear flow system where costs, material wastes, and negative environmental and social impacts are all continuing to increase rapidly. The technology disclosed in the present disclosure shifts the paradigm of manufacturing and its core elements: products, processes, and systems to significantly reduce these negative impacts with a view to continuously improve manufacturing productivity and quality at reduced costs. Herein is disclosed a progressively improving/evolving manufacturing system that reduces costs and material/resource wastes and improves manufacturing productivity and product/process quality while making positive societal and environmental impacts.

The Circular Economy (CE) concept is a framework promising to simultaneously reduce anthropogenic emissions while generating business value. However, CE mainly lives in ambiguity in the manufacturing domain because CE does not specifically address the changes needed at product, process, and system levels. Also, due to the public relations advantage around CE and the differentiation it establishes in business-to-business (B2B) markets, industry has seen many misrepresentations of the implementation of CE. Numerous manufacturers are relabeling business practices as being a new implementation of CE, when in reality; the practice was already in existence. Even for the legitimate ones, the CE approach taken is more aligned with a waste management strategy than with manufacturing framework. For these reasons, CE is currently a conceptual retrofit for the linear economy. To move beyond a retrofit, CE needs to extend itself to include a system-level redesign of products, processes, and systems that decouple economic growth from resource consumption.

Three gaps have been identified in the current landscape of the CE concept: i) Practitioners need a set of guidelines to be able to apply a conceptual framework in an industrial setting; ii) Degrowth and Steady State economics are not viable options for the significant portion of the world that lives in poverty. Economic growth needs to be decoupled from resource consumption through a system-level redesign of products, processes, and systems; and iii) A waste management strategy is not sufficient. Omitting the Redesign and Remanufacturing elements of the 6R (Reduce, Reuse, Recycle, Recover, Redesign, Remanufacture) framework can result in negative impacts on innovation and economic growth, resulting in systems and methods that are primarily waste management strategies.

To address these gaps, the present disclosure introduces a Helical Economy (HE) manufacturing framework as a novel extension to CE. HE aims to better align with manufacturing stakeholders and to be practical for both business leaders and practitioners. It does this by leveraging an Internet of Things (IoT) infrastructure and by reimagining the fundamental elements of manufacturing: products, processes, and systems. An overview and visual representation of the framework is shown, as well as guidelines for the IoT infrastructure and the designing and redesigning for the helical economy at the product, manufacturing process, and system level.

By the present disclosure, elements of a Helical Economy Manufacturing System (HEMS) are disclosed providing a powerful methodology providing a paradigm shift in manufacturing. The disclosed technology leverages next-generation manufacturing infrastructure comprising Internet-of-Things (IoT)-connected products, manufacturing equipment, and manufacturing systems that work in harmony to minimize adverse environmental impacts, maximize productivity, maximize product/process quality, and minimize manufacturing costs. As the skilled artisan will appreciate, the technology finds applicability in numerous areas including without intending any limitation the automotive, aerospace, consumer electronics, power industry, biomedical, machinery, and pharmaceutical manufacturing industries. The disclosed technology advantageously provides opportunities for reductions in manufacturing cost and environmental impact which can provide a competitive advantage in the market as well as benefitting the reputation of the manufacturer. Equally, the technology is applicable to a broader range of applications, including without intending any limitation for life cycle management of aging infrastructures such as buildings, bridges, mining and extraction equipment, oil and gas equipment, etc.

SUMMARY

In the following description, there are shown and described several embodiments of methods for managing a product life cycle. In one aspect, a method for managing a modular product life cycle in a cloud-hosted computing system environment is described. The method comprises, by a central computing device or system, receiving a plurality of inputs representative of one or more of: an expected life cycle of a modular product, a market demand for the modular product, a manufacturing process for assembling the modular product, a reverse manufacturing process for disassembling the modular product into one or more constituent modular components and/or materials, and one or more technical engineering constraints associated with the product. The modular product comprises a plurality of reconfigurable common components.

The central computing device or system determines a first modular product design according to the plurality of inputs. During the life cycle of the modular product the central computing device or system receives a second plurality of inputs representative of one or more of: a market demand for the modular product, a manufacturing process for assembling the modular product, a reverse manufacturing process for disassembling the modular product into one or more constituent modular components and/or materials, and one or more technical engineering constraints associated with the product. The central computing device or system determines a second modular product design according to the second plurality of inputs. In embodiments, the method includes a second manufacturing process comprising disassembling at least a portion of the first modular product design and reconfiguring one or more of the reconfigurable common components obtained from the first modular product design to provide the second modular product design.

The central computing device or system includes one or more processors connected to and configured to receive inputs from a plurality of sensors. This may be an IoT networked system comprising sensors carried by or associated with one or more of: a modular product; a manufacturing process for assembling the modular product, a manufacturing process for disassembling the modular product; and a manufacturing system for implementing the manufacturing processes of assembling and/or disassembling the modular product.

In embodiments, the one or more processors include computer-executable instructions comprising a data collection layer, a centralized data storage layer, and an application layer. The data collection layer is configured to receive the inputs from the plurality of sensors. The centralized data storage layer may include storage for storing a database of the inputs from the plurality of sensors and a database of historical/empirical inputs regarding the modular product. The application layer comprises a modular product design module, a modular product evaluation module, and a modular product configuration/reconfiguration module.

In embodiments, the modular product design module includes computer-executable instructions for predicting the modular product life cycle by a machine learning regression algorithm derived from historical performance data of one or more similar products and for determining one or more initial configurations for the modular product. The historical performance data of one or more similar products may include one or more of environmental impact, life cycle cost, and resource consumption.

In embodiments the modular product evaluation module includes computer-executable instructions for receiving performance data of the modular product from sensors carried by or associated with the modular product or carried by or associated with similar products.

In embodiments, the modular product configuration/reconfiguration module includes computer-executable instructions for determining an initial configuration and/or a reconfiguration of the modular product according to one or more user-determined conditions including one or more of market demand data, engineering constraints associated with manufacturing the modular component, estimated environmental impact associated with the modular component, and estimated life cycle cost associated with the modular component.

As it should be realized, the described systems, devices, and methods are capable of other, different embodiments and their several details are capable of modification in various, obvious aspects all without departing from the presently described systems, devices, and methods as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification illustrate several aspects of the PUF architecture and attendant methods and together with the description serve to explain certain principles thereof. In the drawings.

Reference will now be made in detail to the present preferred embodiments of the disclosed systems, devices, and methods, examples of which are illustrated in the accompanying drawing figures.

DETAILED DESCRIPTION

At a high level, the present disclosure provides manufacturing systems, devices, and methods implementing a Helical Economy (HE) manufacturing framework as a novel extension to CE. The CE concept is defined as a framework that is "restorative and regenerative by design, and aims to keep products, components, and materials at their highest utility and value at all times." While CE is considered to appeal to both environmentally conscious and economically conscious agendas, it has not directly translated into implementation since practitioners require concrete guidelines that can be applied in an industrial setting. The framework disclosed herein better aligns with manufacturing stakeholders and is practical for both business leaders and practitioners by leveraging an Internet of Things (IoT) infrastructure and by reimagining the fundamental elements of manufacturing: products, processes, and systems. It will be readily appreciated by the skilled artisan that the described systems, devices, and methods are adaptable to inclusion of additional and/or alternative systems, devices, and or methods. Accordingly, the description should not be taken as limiting in that regard.

Figure 1:
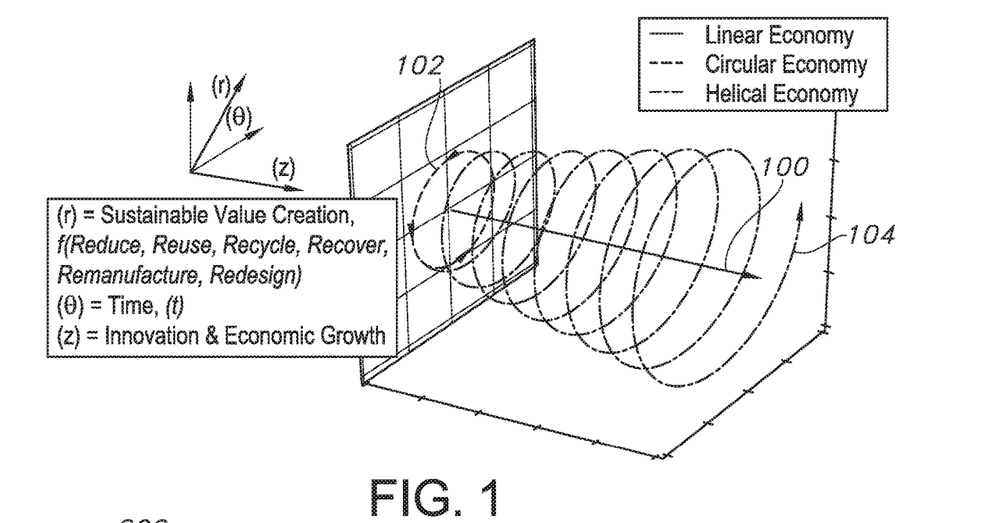
FIG. 1 illustrates a Helical Economy according to the present disclosure compared to Linear and Circular Economies.

To visualize the HE, one must expand the typical two-dimensional space often used in the linear and circular case to a three-dimensional cylindrical space:

$$r = SVC(R_{1-6}) = f \text{ Reduce, Reuse, Recycle, Recover, Redesign, Remanufacture: } 0,1 \tag{1}$$

$$\theta = f \, t{:}\phi_k, \phi_{k+1} \tag{2}$$

$$z = \text{Innovation \& Economic Growth}{:}k, K \tag{3}$$

where z is the innovation and economic growth achieved throughout time, $\theta$=f t is time, and r≡SVC($R_{1-6}$) is the sustainable value creation achieved as a function of the 6Rs (Reduce, Reuse, Recycle, Recover, Redesign, and Remanufacture). r is bounded by 0, representing no value creation, and 1, the theoretical maximum sustainable value. $\theta$ is finite and bounded by the k-th generation time interval, $\phi_k$, and the k+1 generation time interval $\phi_{k+1}$. z has a lower bound, k, and an upper bound, K. The gray plane, k, is the ecological limit of innovation and economic growth under circular economy conditions and K is the limit under helical economy conditions. This is graphically represented in FIG. 1.

As shown in FIG. 1, the Linear Economy 100 delivers economic growth and innovation, but at the expense of sustainable value leading to long-term harm to the economy, the environment, and society. The Circular Economy 102 is depicted existing in the two-dimensional plane at k, which is the CE's theoretical maximum value that is a function of the use of the 4R elements (Reduce, Reuse, Recycle, Recover). Omission of Redesign and Remanufacture can result in a negative impact on innovation and economic growth.

As will be discussed, the Helical Economy 104 adds three advances to the Circular Economy 102. First, the Helical Economy 104 creates more sustainable value through the utilization of all 6R elements. Redesign and Remanufacture result in a system-level change that creates more sustainable value. Second, the Helical Economy 104 encourages continued innovation and economic growth, while the Circular Economy 102 remains at a flat, steady state. The ability to continue growing results in a hopeful scenario for being able to lift the developing world out of poverty. Third, the Helical Economy 104 considers the transient state away from the linear economy. Continuing the helix in the −z-direction would eventually result in the Helical Economy 104 meeting the Linear Economy 100. Understanding the transient behavior of moving away from the Linear Economy 100 and its continuance during innovation is critical for mitigating obsolescence. These advances are achieved through leveraging an IoT infrastructure and an entire system-level redesign. A set of guidelines follows for the IoT infrastructure and the implementation of the system-level redesign at product, process, and system levels.

It can be said that the Internet of Things (IoT) is a means for aligning the physical and information life cycles. This vision suggests that this intimate connection and the information itself present a major source of value. However, to extract this value, the IoT infrastructure must be leveraged in a framework that presents an opportunity at realizing this value. In context of the Helical Economy framework, an IoT data management infrastructure can be leveraged to widen the helix to maximum point of sustainable value creation. This requires a total dynamic view of the life cycle. Data is collected while the product is manufactured, while in use, and when recovered for reprocessing. This data flow is critical for data-driven design of new products and the data-driven redesign of existing products. To successfully leverage IoT in the implementation of the helical economy framework, practitioners should look to the following guidelines: 1. Ensure total life cycle coverage: design, manufacturing, use, and post-use; 2. Minimize hardware deployed through domain expert knowledge of the physical system; and 3. Capture an external data feed for near real-time market demand.

Figure 2:
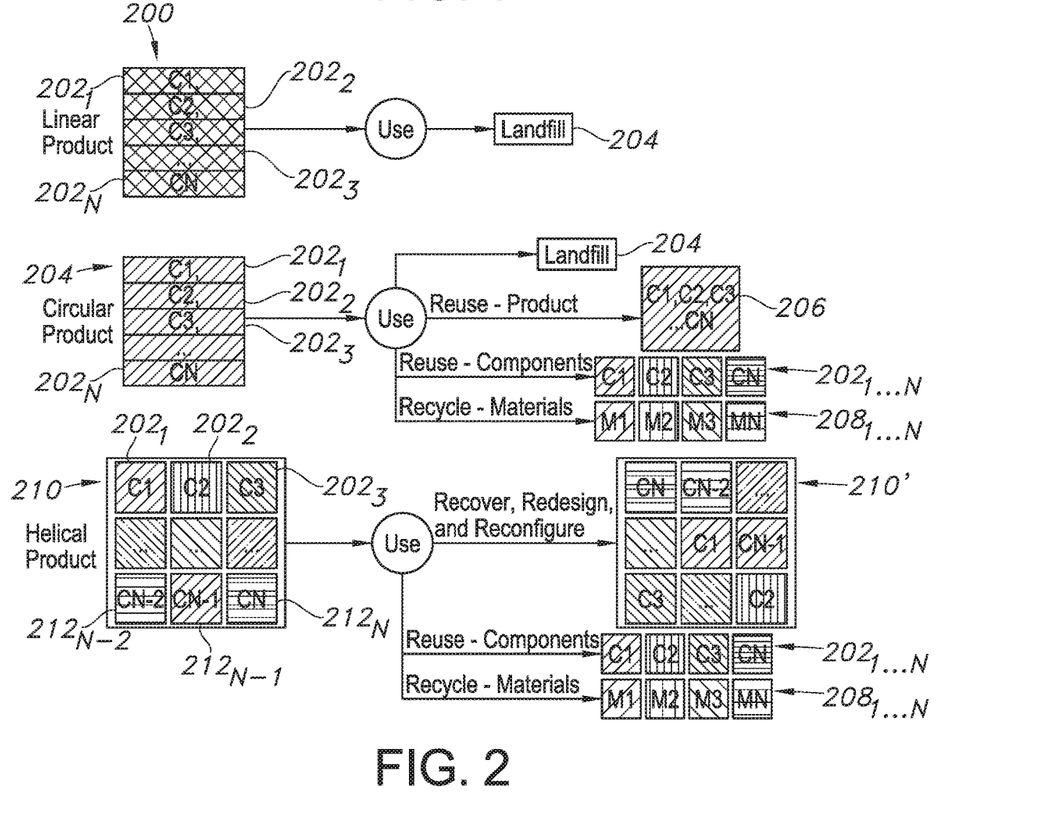
FIG. 2 provides a conceptual representation of Linear, Circular, and Helical products.

At the product level, the linear economy has defined everything from the conceptual understanding of products; the tools and processes that have been created to develop products; and the way the system boundary is defined when approaching a product's design problem. Therefore, delivering on the Helical Economy vision requires reimagining the entire production process. Products have to be designed in way to eradicate obsolescence, encourage innovation and minimize waste. Life cycle information has to be made available to designers early in the design process by leveraging the IoT data management system. The tools and processes integrated into the work streams of manufacturers have to be overhauled. With reference to FIG. 2, the linear product 200 is composed of an assembly of C1, C2, . . . , CN components 202. The product 200 is then used and disposed of resulting in zero sustainable value creation. The circular product 204 is still composed of the same C1, C2, . . . , CN components 202 because it is still locked into being created by the linear tools and technologies of today's manufacturing environ. However, sustainable value is extracted through the reuse of products 206 and components 202 and the recycle of M1, M2, . . . , MN materials 208. The linear locked-in design of the circular product limits the amount of sustainable value that can be extracted.

To address this, HE goes beyond CE to include a redesign effort. The helical product 210 is comprised of modular components 212 that are reconfigurable to the market demand. Post-use, the product 210 can be reconfigured into a new product 210', or the material 208 can be transferred out of the product life cycle in the form of components via parts harvesting and/or materials via recycling. Certain guidelines were considered in implementing the HE framework at the product level: 1) Establish a product level data infrastructure was established that collects unit process data across the design, manufacturing, use, and post-use stages. This data must be fed into a new suite of design tools that leverage interactive real-time Life Cycle Assessment and Life Cycle Costing; 2) Products must be reconfigurable and use common components and materials). Using manual or automated processes, components must be able to be rearranged into new products to meet immediate demand; 3) Products must be designed in parallel to the manufacturing and reverse manufacturing processes; and 4) Products and components must be designed to last for multiple generations. However, the extreme durability must be met with reconfigurability in order to keep products and components at their highest possible value without overdesigning and becoming obsolete.

Figure 3:
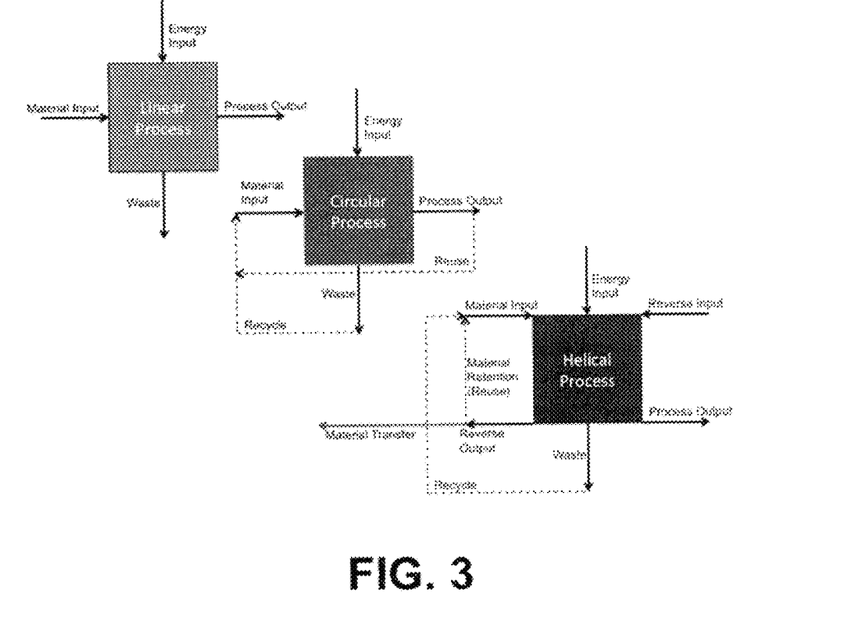
FIG. 3 provides a conceptual representation of Linear, Circular, and Helical manufacturing processes.

At the manufacturing process level, the linear economy has dramatically defined the existing technologies that are in use today. Since the Industrial Revolution, development and investment from manufacturers have supported a one-way flow of products, from getting raw materials at their gate to delivering a finished product to their end customers. As such, the current manufacturing infrastructure and technology caters to this linear economy based one-way flow of inputs and outputs (see FIG. 3). However, why must one limit manufacturing process technology to the world of inputs and outputs? Instead, to achieve the helical economy vision, helical manufacturing processes must become multi-dimensional, being able to manufacture and reverse manufacture multiple products to meet the current market demand. As shown in FIG. 3, helical manufacturing processes have a reverse manufacturing step in situ to that of the original manufacturing process. The material from the reverse manufacturing step is then either transferred to a different process or retained and reprocessed. This decision is made by leveraging the IoT data management system in combination with current market conditions to determine which products meet current demand. The IoT infrastructure is also leveraged to collect information from other products and manufacturing processes to continuously improve product performance by informing changes to the manufacturing process proactively. Using information gathered from monitoring products in the field, near real-time sustainability performance enhancements can be made on the manufacturing floor. Certain guidelines were considered in implementing the HE framework at the process level: 1) Establish a manufacturing process level data infrastructure that collects activity data and controls all forward and reverse manufacturing activities; 2) Processes and machines must be designed to be multi-dimensional; they must be able to reverse manufacture in situ to the original manufacturing process; and 3) Establish logic for retention of the material or transferring the material to another process.

Figure 4:
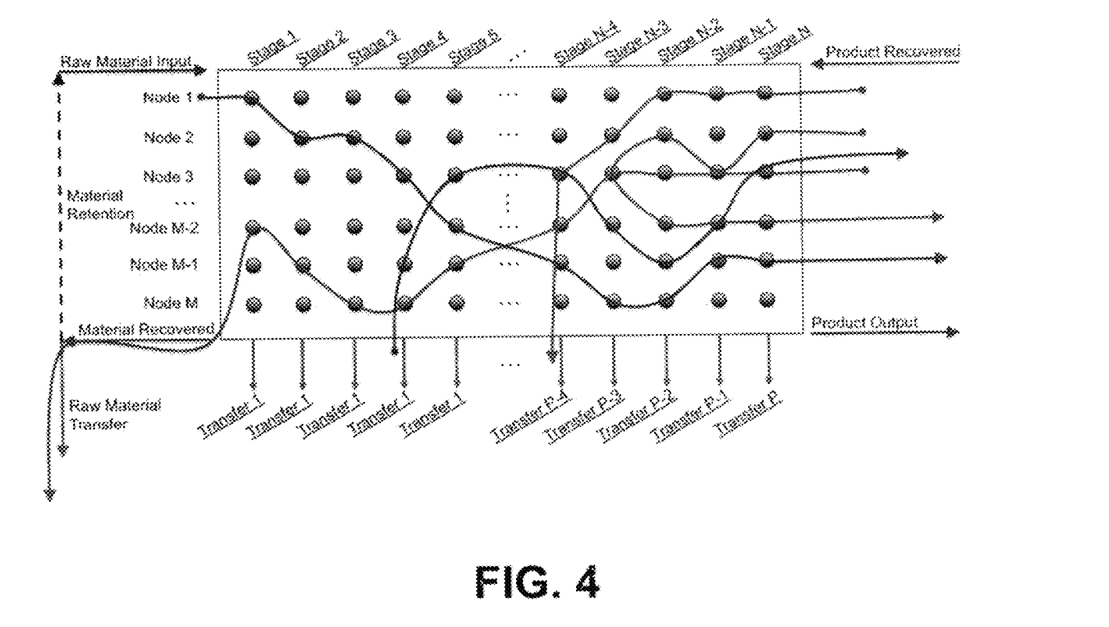
FIG. 4 provides a conceptual representation of Linear, Circular, and Helical manufacturing systems.

At the system level, the product and process level themes of reconfigurable products and two-way flow come together to reimagine a helical manufacturing system (see FIG. 4). A helical manufacturing system has to be able to respond to market demand instantaneously. With this consideration, a helical manufacturing system builds on the concept of reconfigurable manufacturing systems (RMS) to leverage the same machines for both manufacturing and reverse manufacturing processes. Manufacturing "lines" are now reconfigurable matrices of S1, S2, ..., SN stages and N1, N2, ..., NM nodes interconnected through the IoT data management infrastructure (see FIG. 4). Products in the forward manufacturing path take advantage of the reconfigurable and flexible manufacturing stage-node combinations to support many SKUs while achieving maximum throughput. Products that enter into the reverse logistics channel are deconstructed into components and materials and then allocated to the next best stage-node combinations that keep the components and materials at the highest possible value. Materials and components can be transferred to or from another product line at any point in the process via transfer points T1, T2, ..., TP. All decisions between stage-node combinations are made based on maximizing sustainable value. Certain guidelines were considered in implementing the HE framework at the system level: 1) Establish a matrix of S1, S2, ..., SN stages and N1, N2, ..., NM nodes; 2) Nodes must be processes that can manufacture and reverse manufacture; 3) Establish a set of Transfer In/Out points T1, T2, ..., TP; and 4) Establish logic for movement between stage-node combinations and transfer points.

Figure 5:
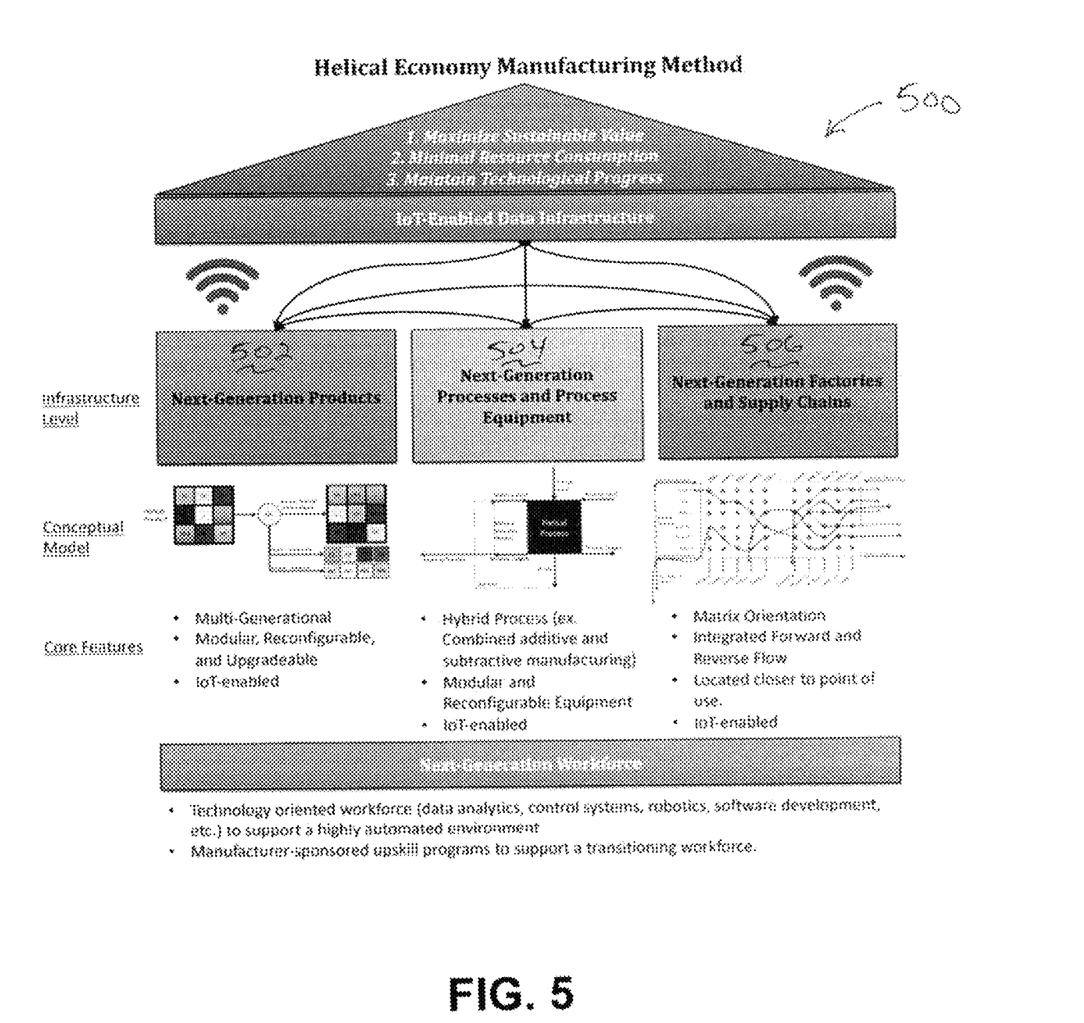
FIG. 5 provides a conceptual representation of a Helical Economy Manufacturing Method according to the present disclosure.

To address these and other considerations, the present disclosure is directed to a Helical Economy Manufacturing System (HEMS) 500 encompassing a powerful novel methodology which provides a paradigm shift for manufacturing. This is illustrated conceptually in FIG. 5. HEMS 500 leverages a next-generation manufacturing infrastructure that consists of IoT-connected products 502, IoT-connected manufacturing equipment 504, and entire IoT-connected manufacturing systems 506 concurrently working in harmony to minimize the adverse environmental impacts, maximize productivity, maximize product/process quality, and minimize manufacturing costs. The described HEMS is powered by software/hardware systems and tooling having the capabilities that are required in order to design and then manage a product through multiple life cycles and reconfigurations. Linear manufacturing systems and devices do not possess such software, hardware, and tooling.

In one aspect, the disclosure relates to products designed to be modular, reconfigurable, and comprised of a set of common components (see FIG. 2). The so-designed products are extremely durable and able to last for multiple product generations. By means of both automated and manual processes, the products are designed for reconfigurability for rearrangement into new products to meet immediate demand. The subject products are designed in parallel to a set of manufacturing and reverse manufacturing processes to ensure ease of disassembly and reusability.

In another aspect, manufacturing processes according to the disclosure are designed to accommodate a two-way flow of inputs and outputs (see FIG. 3). The processes are multi-dimensional, intended to manufacture and reverse manufacture multiple products to meet a current market demand. A reverse manufacturing step is provided in situ with the original manufacturing process. Materials from the reverse manufacturing step may be either transferred to a different manufacturing stage or retained for reprocessing.

In still another aspect, manufacturing systems according to the present disclosure are designed to handle a two-way product flow (see FIG. 4). The systems comprise manufacturing lines provided as reconfigurable matrices of multiple manufacturing stages, equipped with the processes described above. A forward flow system according to the disclosure operates as a reconfigurable manufacturing system, allowing customization according to a then-existing market demand of products. A reverse flow system according to the disclosure operates by intake of products from a reverse logistics channel, disassembles the products into constituent components and materials, and allocates the components and materials according to a determined optimum next best use or manufacturing process. The disassembled components and materials are ultimately reconfigured into new products and returned for customer use.

Figure 6:
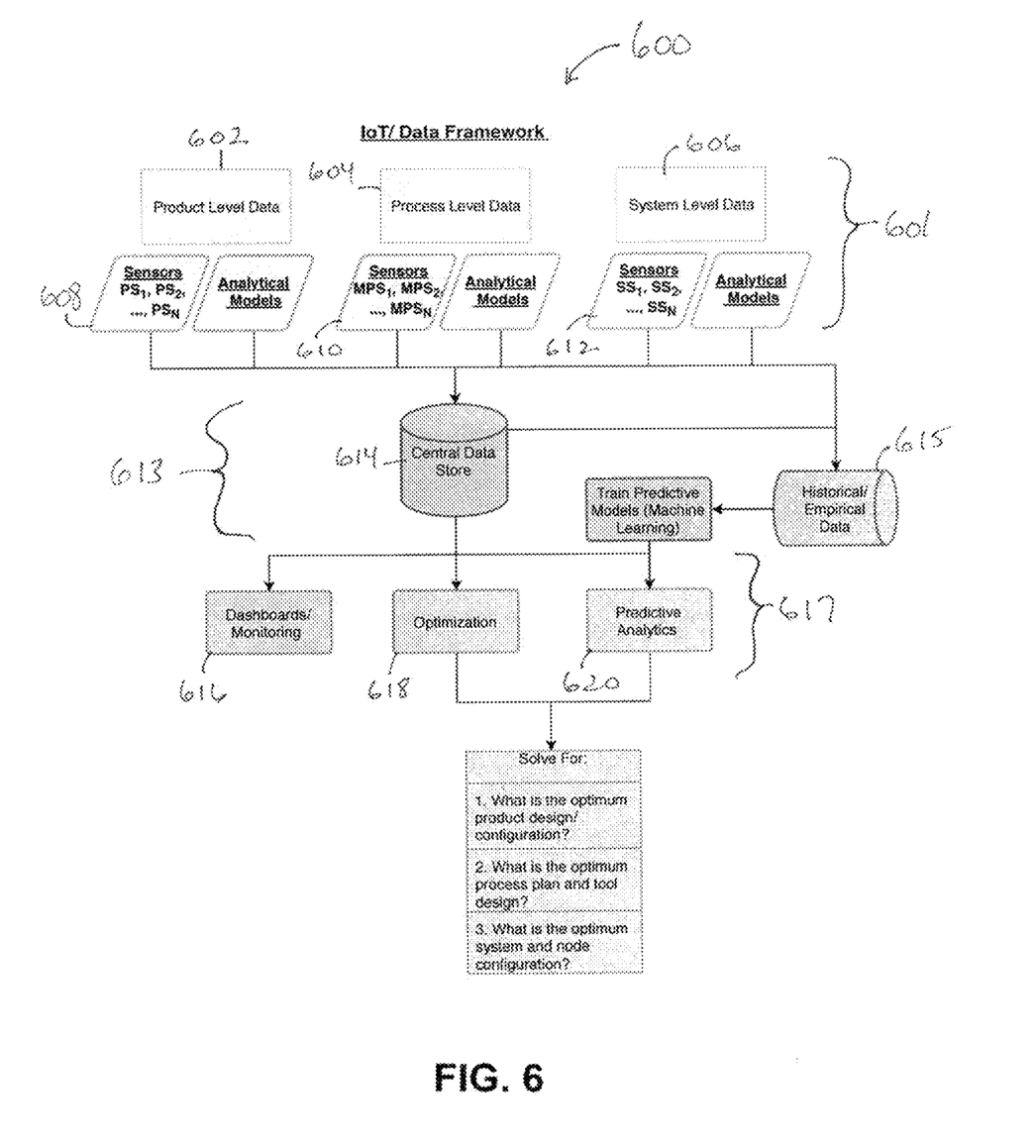
FIG. 6 illustrates a representative manufacturing system according to the present disclosure.

In yet another aspect, a software backbone 600 according to the present disclosure leverages an existing IoT and data infrastructure (see FIG. 6). A data collection layer 601 is provided whereby data is collected at various input points, including at the product level 602, the process level 604, and the system level 606. The inputs are retrieved from a sensor network such as an IoT sensor network by way of networked product-associated sensors 608, process-associated sensors 610, and system-associated sensors 612. Data is pushed to a centralized data storage layer 613 comprising one or more first computing devices 614 including at least memory, storage, and one or more processors, for example computing devices associated with a cloud server or server farm. Further, data are collected across all product life-cycle phases, including design, manufacturing, use, and post-use. The collected data are compiled and combined with real-time marketing demand signals stored on one or more second computing devices 615 including at least memory, storage, and one or more processors and comprising a historical/empirical database to provide information for optimal decision making as described above. Example decisions include reconfiguring products according to determined market demand, determining optimized process plans, determining optimal system and system level configuration, and others. An application layer 617 superimposed on the data collection layer 613 may operate as a tool kit. Among other features, the tool kit may include dashboards and monitoring controls 616, optimization functions 618, and machine learning-derived predictive analytics 620 to support informed decision making. In combination, the data collection layer 601, the centralized data collection layer 613, and the application layer 617 operate to determine optimum product design/configuration, optimum process (manufacturing) plan and tooling design, and optimum manufacturing system and node configuration.

Figure 7:
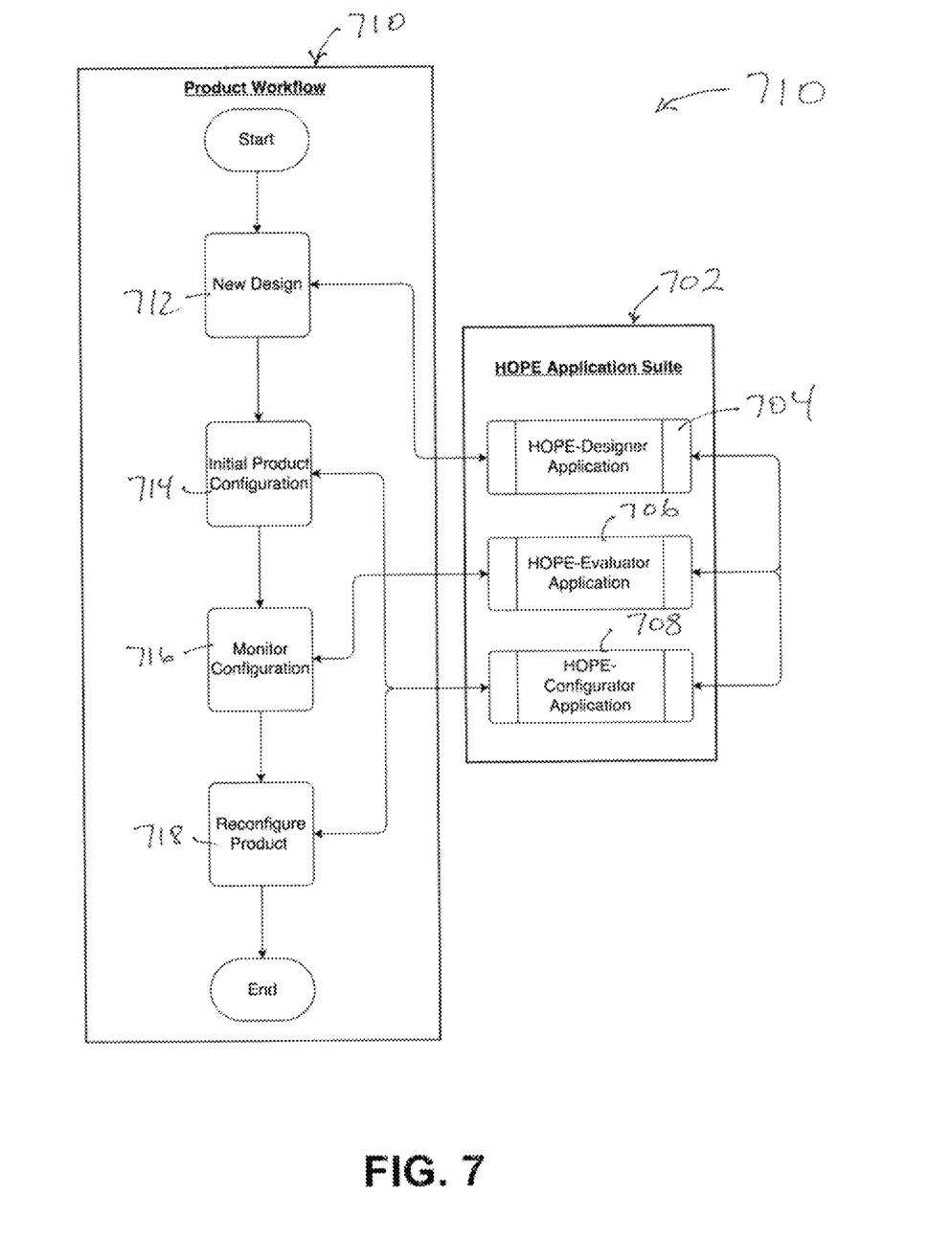
FIG. 7 shows in flow chart form operation of a cloud-based product life cycle management (PLM) system according to the present disclosure, for monitoring helical product workflow to enable and facilitate multi-generational products including new product design, product configuration, product monitoring, and product reconfiguration.

To accomplish this, the present disclosure in embodiments of the application layer 617 provides a Helical Optimization and Prediction Engine (HOPE) 702 providing a real-time, cloud-based product life cycle management (PLM) system 700 (see FIG. 7). This PLM 700 manages a product workflow through dashboards and controls, and enables automated decision making at scale through machine-learning (ML) supported applications. The engine 702 may be provided as a stand-alone product or a plug-in to an existing PLM system. HOPE stores data that is collected from products using networked sensors that continuously send data to its central cloud (see FIG. 6). HOPE contains three integrated machine-learning (ML) based application modules 704, 706, 708 (HOPE-Designer, HOPE-Evaluator, HOPE-Configurator) that help a human user manage each step of a helical product workflow 710 to enable and facilitate multi-generational products. Workflow 710 comprises steps of: new product design 712, product configuration 714, product monitoring 716, and product reconfiguration 718.

For new product design 712, a user utilizes HOPE-Designer module 704 to predict the life cycle performance of their design. The HOPE-Designer module 704 is able to do this through training an application specific machine learning regression algorithm that is based on historical performance data of similar products (see FIG. 6). Data is collected at the product, process, and system levels using networked sensors that continuously send data to a central cloud (see Id.). The described PLM module manages product workflow through dashboards and controls and enables automated decision-making at scale through machine-learning (ML) supported applications.

Figure 8:
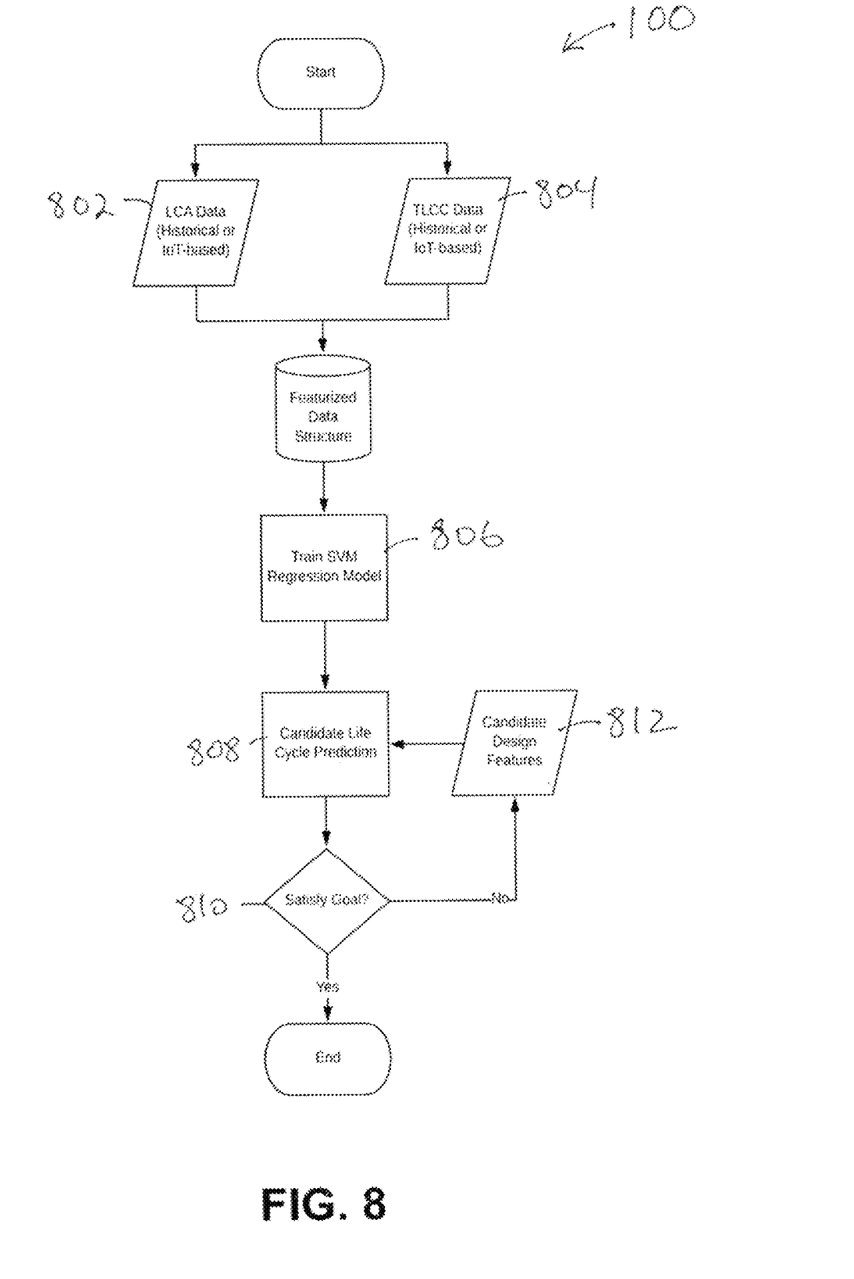
FIG. 8 shows in flow chart form operation of a HOPE-Designer module according to the present disclosure.

The operation 800 of the HOPE-Designer module 704 is illustrated in FIG. 8. The module uses collected historical field data 802, 804 sourced from performance of similar products and analytical models to predict environmental impact, life cycle cost, resource consumption, and other user-defined indicators. The module provides designers and engineers with directionally correct heuristics instead of first requiring detailed life cycle information that is time-consuming and costly to collect. To accommodate changes in design features according to particular stakeholders, at step 806 the module generates multiple predictive models to provide the optimum "possible solution space" and arrive at a candidate product life cycle prediction at step 808. If the prediction is found (step 810) to satisfy predetermined environmental impact, life cycle cost, resource consumption, etc. goals, the process ends. If not, at step 812 the system inputs one or more alternative design features and re-valuates the altered product design life cycle prediction.

Figure 9:
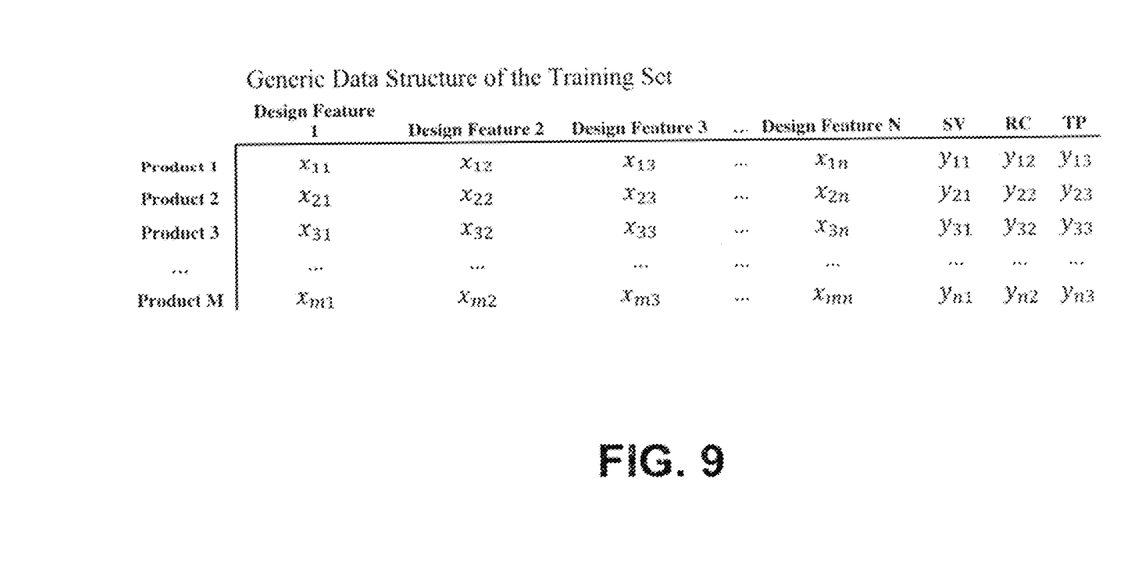
FIG. 9 shows a data structure for a training set for the HOPE-Designer module of FIG. 7.

The HOPE-Designer module 704 begins with a data training set illustrated in FIG. 9. This data is used to train the model in order to predict outcomes such as sustainable value (SV), resource consumption (RC), and technological progress (TP).

Figure 10:
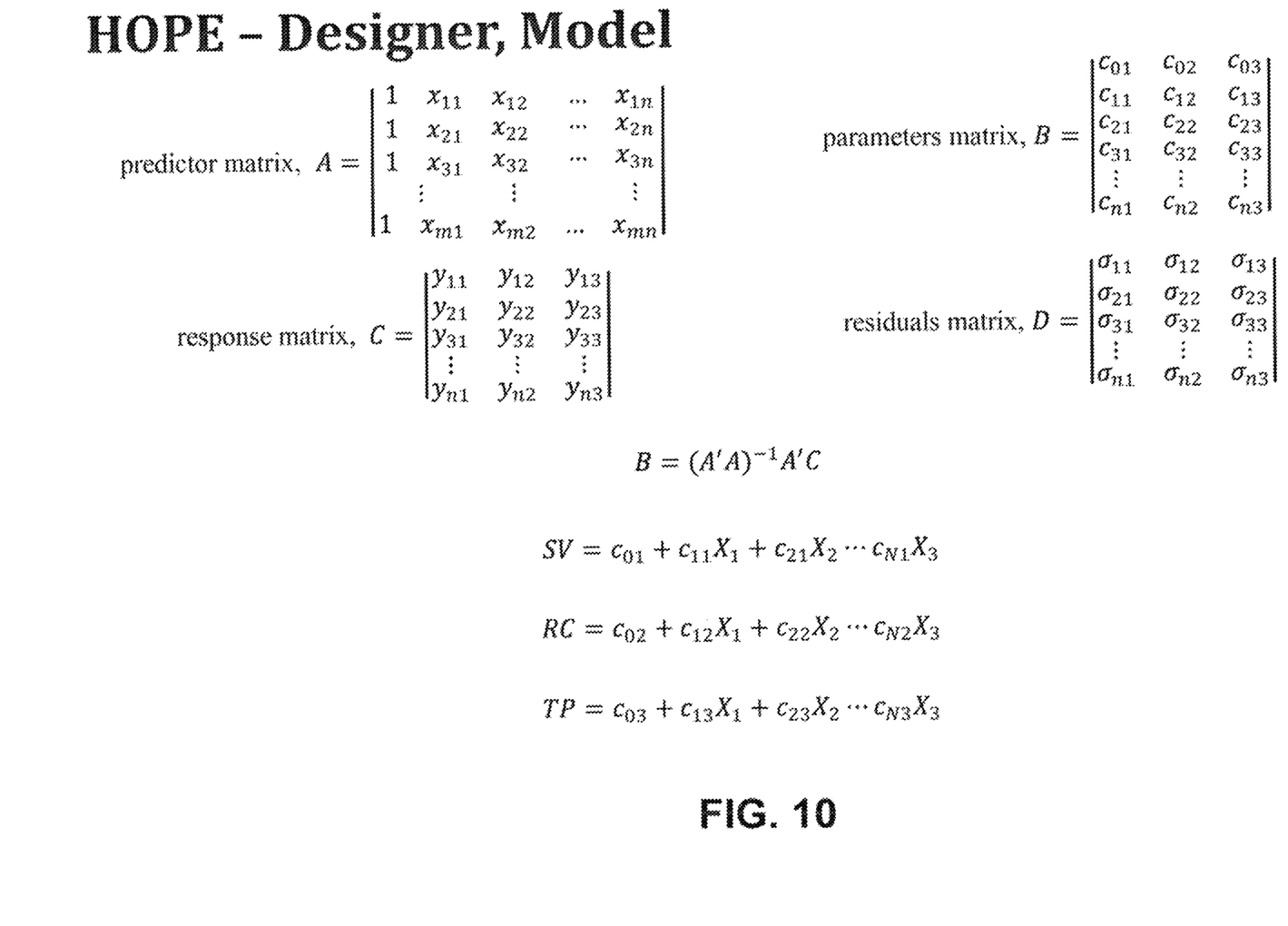
FIG. 10 illustrates predictor, parameters, response, and residuals matrices for the HOPE-Designer module of FIG. 7.

To train the model (see FIG. 10), the data is split into a predictor matrix A and a response matrix C, and output into a parameters matrix B and a residual matrix D. The parameters B are calculated according to the formula $B=(A'A)^{-1}A'C$, and the outcomes of SV, RC, and TP are calculated according to the formulae:

$$SV=c_{01}+c_{11}X_1+c_{21}X_2\ldots c_{N1}X_3$$

$$RC=c_{01}+c_{12}X_1+c_{22}X_2\ldots c_{N2}X_3$$

$$TP=c_{01}+c_{13}X_1+c_{23}X_2\ldots c_{N3}X_3$$

Figure 11:
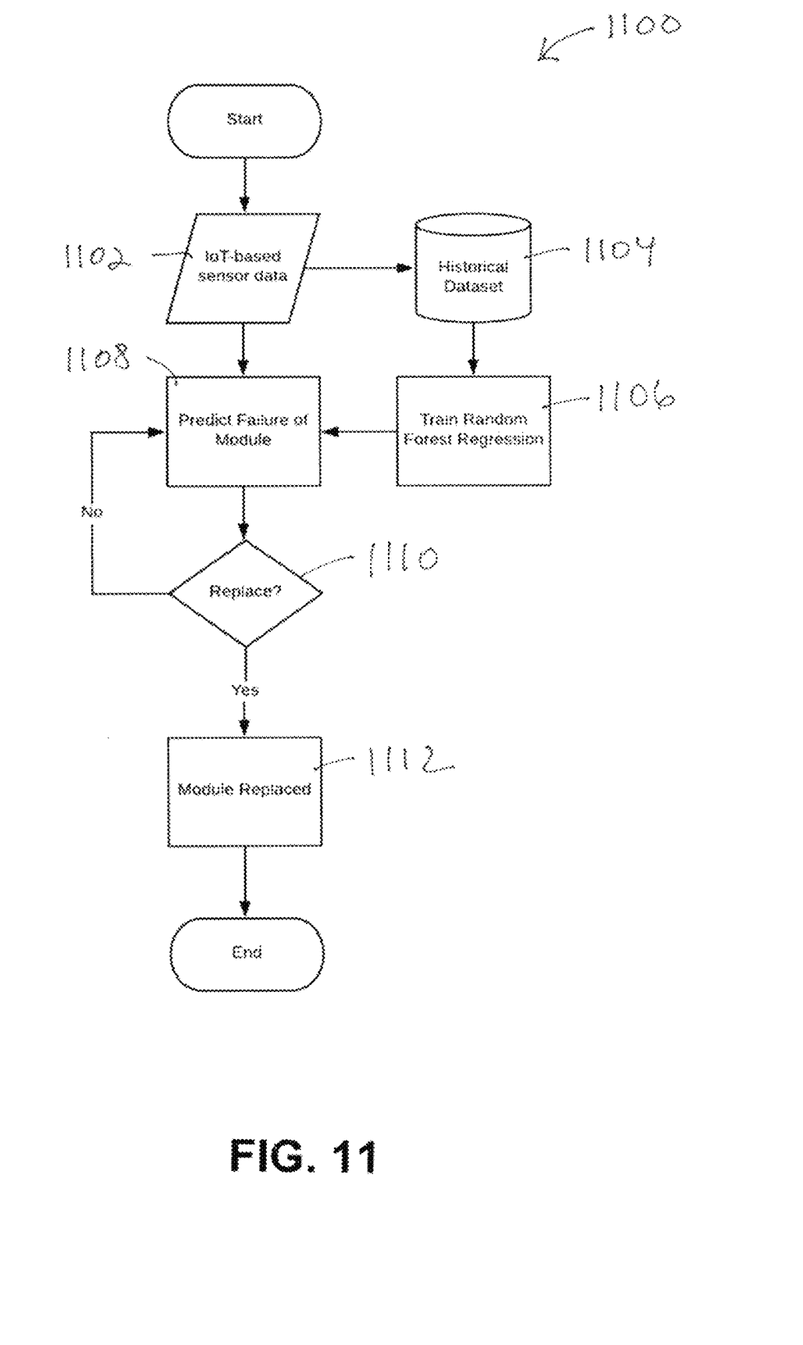
FIG. 11 shows in flow chart form operation of a HOPE-Evaluator module according to the present disclosure.

Once a candidate product design has been approved and implemented, for product monitoring a user utilizes the HOPE-Evaluator module 706 to create a new ML model based on the field data being collected from the new designed product or other similar products. These models determine when the product portfolio needs to be reconfigured. As shown in FIG. 11 and as previously shown and discussed (see FIG. 6), the module uses real-time field data combined with machine learning and analytical models to assess remaining performance (functional, environmental, cost, etc.) based on customer usage patterns and environmental conditions. Sensor data are captured at a module/component level to return sensor readings regarding the module's health. The sensor data is used to train a machine learning model that predicts remaining performance attributes of each module. Using this prediction, the module can be replaced based on a set of conditions defined by a user (life cycle cost, environmental impact, etc.). Specifically, in an evaluation process 1100, at step 1102 sensor inputs such as IoT sensor data and historical performance data (step 1104) for the product or similar products are applied to the models described above (step 1106) to provide a predicted product failure estimate (step 1108) determining whether the product should be replaced. The system uses that estimate in determining whether the product should be replaced (step 1110). If not, the analysis returns to step 1108. If so, at step 1112 the product/modular component is replaced.

Figure 12:
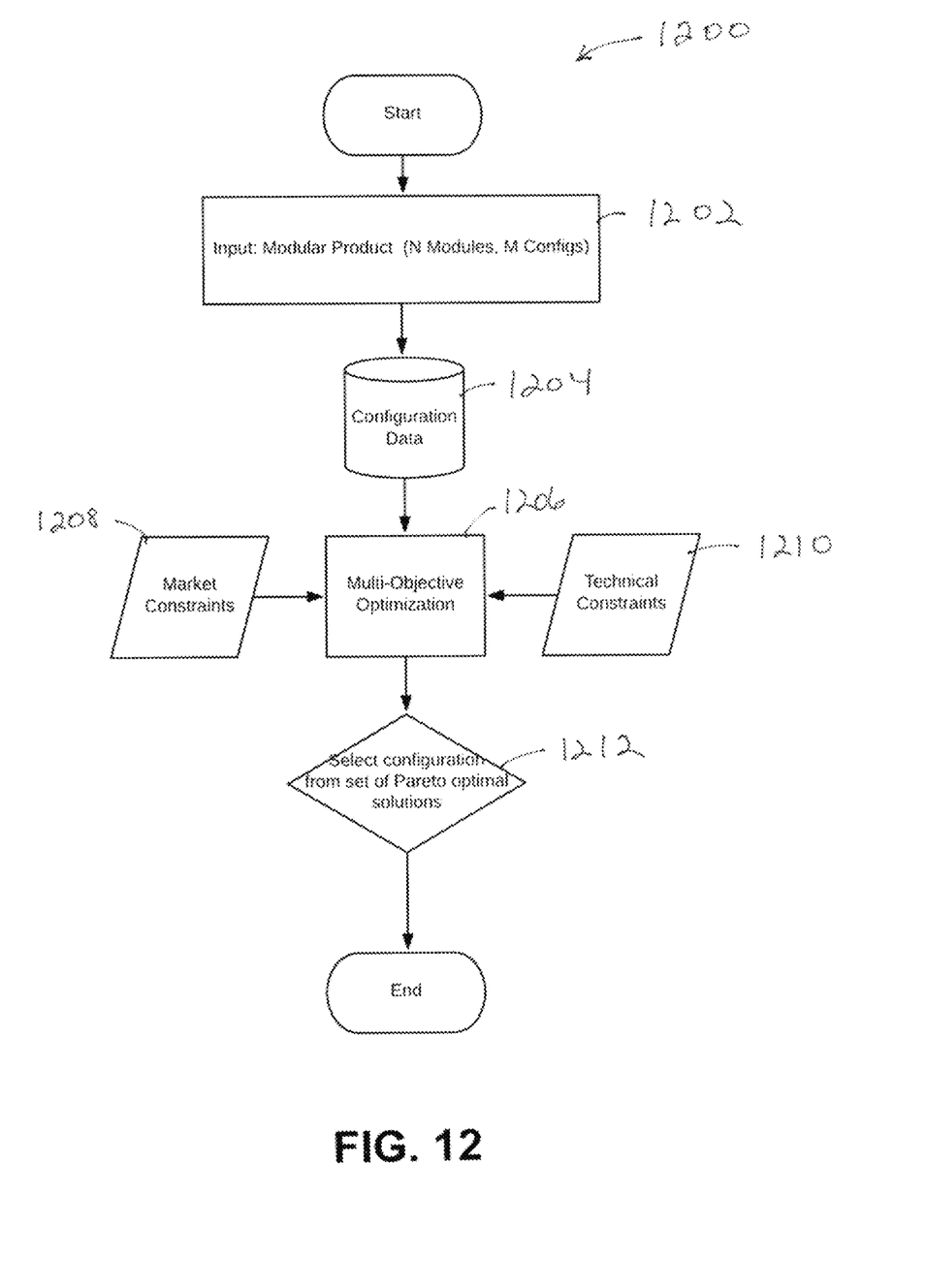
FIG. 12 shows in flow chart form operation of a HOPE-Configurator module according to the present disclosure.

For product configuration, a user utilizes the HOPE-Configurator module 708 to determine the optimal initial configuration of the product portfolio based on data collected on customer demand and engineering constraints. This is based on a multi-objective optimization algorithm that uses inputs from HOPE-Designer module 704 as the objective functions. As shown in FIG. 12, this module uses demand planning data, technical engineering constraints, and other conditions set by a user to determine an optimum configuration for an individual product or fleet of products. This module assumes a product made of modular components having a finite number of possible configurations and determines an optimal initial configuration and succeeding reconfigurations for a second . . . N uses according to a user-defined set of conditions (environmental impact, cost, etc.). Real-time market data is used to indicate demand of a configuration, and then the algorithm selects the best configuration based on market demand, technical constraints (remaining life—HOPE Maintain), estimated environmental impact (HOPE-Design), estimated life cycle cost (HOPE-Design), software compatibility, reliability, etc.), and other user-set conditions.

With reference to FIG. 12, the HOPE-Configurator module 708 implements a process 1100 wherein the module receives (step 1202) as input information regarding a particular modular product composed of N modular components and having M possible configurations and outputs a set of potential product configuration data (step 1204). At step 1206, the HOPE-Configurator module 708 implements a multi-objective optimization step comprising inputting real-time market data (step 1208) to determine demand of a particular product configuration and inputting technical constraint data (step 1210; remaining product life, estimated environmental impact and estimated life cycle cost as determined by HOPE-Designer module 704, software compatibility, reliability, and other user-set conditions). From this determination, at step 1212 the module 708 selects as optimal product configuration for a product or product portfolio. As will be appreciated, the process 1200 incorporates data indicative of customer demand and engineering constraints. Inputs from both HOPE-Designer module 704 and HOPE-Evaluator module 706 are used as objective functions. See FIG. 7.

As an example, a printer manufacturer is determining what modules of a printer are going to be included in the default configuration at product launch. The multi-objective optimization algorithm (multiple algorithms can be used: GA, PSO, etc) in HOPE-Configurator takes in market demand data for each modularized feature, and the forecasted life cycle performance of each module to determine the optimal initial module configuration(s) based on the objectives defined by the user. As the printers are used in the field, customer demands change, and the printers may not have the features a customer desires, or the printers have features that are unutilized. Those printers are sent back to the manufacturer and they are reconfigured using HOPE-Configurator's combination of mathematical optimization and machine learning to determine the new optimal configuration based on real-time demand data and the remaining life cycle performance predicted by HOPE-Evaluator.

By storing data centrally, each application module can continuously and concurrently improve their algorithms' capabilities to design, configure, monitor, and reconfigure products, and the associated manufacturing processes, requiring less and less user intervention with more and more accuracy, predictability and consistency. This enables significant cost savings, product/process quality improvements, and significant productivity gains. Customized solutions can be reached for a range of manufactured products and the associated manufacturing systems. Next-generation manufacturing systems equipped with this advanced technology can develop, maintain and advance product design, manufacturing process development and the entire product life cycle management with strategic technological superiority and workforce development against growing international competition.

The foregoing description of a preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the foregoing description and appended claims when interpreted in accordance with the breadth to which they are fairly, legally and equitably entitled.

The invention claimed is:

1. In a cloud-hosted computing system environment, a method for managing a modular product life cycle, comprising:
   providing a central computing device or system comprising one or more processors configured to receive from the cloud-hosted computing system environment a plurality of inputs representative of one or more of: an expected life cycle of the modular product, a market demand for the modular product, a manufacturing process for assembling the modular product, a reverse manufacturing process for disassembling the modular product into one or more constituent modular components and/or materials, and one or more technical engineering constraints associated with the modular product;
   by the central computing device or system, determining a design for the modular product according to the plurality of inputs, the modular product comprising a plurality of reconfigurable modular components;
   during the life cycle of the modular product, by the central computing device or system receiving a next plurality of inputs representative of one or more of: a market demand for the modular product, a manufacturing process for assembling the modular product, a reverse manufacturing process for disassembling the modular product into one or more constituent modular components and/or materials, and one or more technical engineering constraints associated with the modular product;
   wherein at least a portion of the plurality of inputs and of the next plurality of inputs are provided by a plurality of sensors carried by or associated with one or more of:
      the modular product or an associated reconfigurable modular component;
      the manufacturing process;
      the reverse manufacturing process; and
      a reconfigurable manufacturing system for implementing the manufacturing process and/or the reverse manufacturing process; and
   by the central computing device or system, determining a next design for a next modular product according to the next plurality of inputs, the next modular product comprising a plurality of reconfigurable modular components of which at least one reconfigurable modular component is derived from the modular product;
   implementing the reverse manufacturing process to disassemble at least a portion of the modular product into the one or more constituent reconfigurable modular components and/or materials; and
   reconfiguring the one or more constituent reconfigurable modular components and/or materials to provide the next modular product according to the second next plurality of inputs.

2. The method of claim 1, wherein the one or more processors include computer-executable instructions comprising a data collection layer, a centralized data storage layer, and an application layer.

3. The method of claim 2, wherein the data collection layer is configured to receive the inputs from the plurality of sensors.

4. The method of claim 2, wherein the centralized data storage layer includes storage for storing a database of the inputs from the plurality of sensors and a database of historical/empirical inputs regarding the modular product.

5. The method of claim 2, wherein the application layer comprises a modular product design module, a modular product evaluation module, and a modular product configuration/reconfiguration module.

6. The method of claim 5, wherein the modular product design module includes computer-executable instructions for predicting the modular product life cycle by a machine learning regression algorithm derived from historical performance data of one or more similar products and for determining one or more initial configurations for the modular product.

7. The method of claim 6, wherein the historical performance data of one or more similar products includes one or more of environmental impact, life cycle cost, and resource consumption.

8. The method of claim 5, wherein the modular product evaluation module includes computer-executable instructions for receiving performance data of the modular product from sensors carried by or associated with the modular product or carried by or associated with similar products.

9. The method of claim 5, wherein the modular product configuration/reconfiguration module includes computer-executable instructions for determining an initial configuration and/or a reconfiguration of the modular product according to one or more user-determined conditions including one or more of market demand data, engineering constraints associated with manufacturing the modular component, estimated environmental impact associated with the modular component, and estimated life cycle cost associated with the modular component.

10. In a cloud-hosted computing system environment, a method for managing a modular product life cycle, comprising:
  providing a central computing device or system including one or more processors connected to and configured to receive inputs from the cloud-hosted computing system environment comprising at least one other computing device or system and a plurality of sensors carried by or associated with one or more of: a modular product, a manufacturing process for assembling the modular product, a manufacturing process for disassembling the modular product, and a manufacturing system for implementing the manufacturing processes of assembling and/or disassembling the modular product;
  by the central computing device or system, receiving:
    from the plurality of sensors, a plurality of inputs representative of one or more of: an expected life cycle of the modular product, a manufacturing process for assembling the modular product, a reverse manufacturing process for disassembling the modular product into one or more constituent modular components and/or materials, and one or more technical engineering constraints associated with the modular product; and
    from the at least one other computing device or system, one or more inputs representative of a current market demand for the modular product;
  by the central computing device or system, determining a design for the modular product according to the plurality of inputs and the one or more inputs representative of the current market demand, the modular product comprising a plurality of reconfigurable modular components;
  during the life cycle of the modular product, by the central computing device or system receiving:
    from the plurality of sensors, a next plurality of inputs representative of one or more of: a manufacturing process for assembling the modular product, a reverse manufacturing process for disassembling the modular product into one or more constituent modular components and/or materials, and one or more technical engineering constraints associated with the modular product; and
    from the at least one other computing device or system, a next one or more inputs representative of a next market demand for the modular product; and
  by the central computing device or system, determining a next design for a next modular product according to the next plurality of inputs and the next one or more inputs representative of the next market demand, the next modular product comprising a plurality of reconfigurable common components of which at least one reconfigurable common component is derived from the previous modular product implementing the reverse manufacturing process to disassemble at least a portion of the modular product into one or more constituent reconfigurable modular components and/or materials; and
  reconfiguring at least a portion of the one or more constituent reconfigurable modular components and/or materials to provide the next modular product according to the next plurality of inputs and the next one or more inputs; and
  iteratively repeating the steps of receiving a next plurality of inputs and a next one or more inputs, determining a next design for the modular product according to the next plurality of inputs, implementing the reverse manufacturing process, and reconfiguring the one or more constituent reconfigurable modular components to provide the next modular product according to the next plurality of inputs.

11. The method of claim 10, wherein the one or more processors include computer-executable instructions comprising a data collection layer, a centralized data storage layer, and an application layer.

12. The method of claim 11, wherein the data collection layer is configured to receive the inputs from the plurality of sensors.

13. The method of claim 11, wherein the centralized data storage layer includes storage for storing a database of the inputs from the plurality of sensors and a database of historical/empirical inputs regarding the modular product.

14. The method of claim 11, wherein the application layer comprises a modular product design module, a modular product evaluation module, and a modular product configuration/reconfiguration module.

15. The method of claim 14, wherein the modular product design module includes computer-executable instructions for predicting the modular product life cycle by a machine learning regression algorithm derived from historical performance data of one or more similar products and for determining one or more initial configurations for the modular product.

16. The method of claim 15, wherein the historical performance data of one or more similar products includes one or more of environmental impact, life cycle cost, and resource consumption.

17. The method of claim 14, wherein the modular product evaluation module includes computer-executable instructions for receiving performance data of the modular product from sensors carried by or associated with the modular product or carried by or associated with similar products.

18. The method of claim 14, wherein the modular product configuration/reconfiguration module includes computer-executable instructions for determining an initial configuration and/or a reconfiguration of the modular product according to one or more user-determined conditions including one or more of market demand data, engineering constraints associated with manufacturing the modular component, estimated environmental impact associated with the modular component, and estimated life cycle cost associated with the modular component.

19. In a cloud-hosted computing system environment, a method for managing a modular product life cycle, comprising:
  providing a central computing device or system including one or more processors connected to and configured to receive inputs from a cloud-hosted computing system environment comprising at least one other computing device or system and from a plurality of sensors carried by or associated with one or more of: a modular product or associated modular components or materials, a manufacturing process for assembling the modular product, a manufacturing process for disassembling the modular product, and a manufacturing system for implementing the manufacturing processes of assembling and/or disassembling the modular product;

during the modular product life cycle, by the central computing device or system receiving:

from the plurality of sensors, a plurality of inputs representative of one or more of: a manufacturing process for assembling the modular product, a reverse manufacturing process for disassembling the modular product into one or more constituent modular components and/or materials, and one or more technical engineering constraints associated with the modular product; and from the at least one other computing device or system, one or more inputs representative of a next market demand for the modular product; and by the central computing device or system, determining a next design for the modular product according to the plurality of inputs and the one or more inputs representative of the next market demand, the next modular product comprising a plurality of reconfigurable common components of which at least one reconfigurable common component is derived from the previous modular product;

implementing the reverse manufacturing process to disassemble at least a portion of the modular product into one or more constituent reconfigurable modular components and/or materials; and reconfiguring at least a portion of the one or more constituent reconfigurable modular components and/or materials to provide the next modular product according to the next plurality of inputs and the next one or more inputs.

20. The method of claim 19, further including, during a life cycle of the next modular product:

from the plurality of sensors, receiving a next plurality of inputs representative of one or more of: a manufacturing process for assembling the modular product, a reverse manufacturing process for disassembling the next modular product into one or more constituent modular components and/or materials, and one or more technical engineering constraints associated with the next modular product;

from the at least one other computing device or system, receiving a next one or more inputs representative of a next market demand for the next modular product;

by the central computing device or system, determining a subsequent next design for the modular product according to the plurality of inputs and the one or more inputs representative of the next market demand, the subsequent next modular product comprising a plurality of reconfigurable common components of which at least one reconfigurable common component is derived from the next modular product;

implementing the reverse manufacturing process to disassemble at least a portion of the next modular product into one or more constituent reconfigurable modular components and/or materials; and reconfiguring at least a portion of the one or more constituent reconfigurable modular components and/or materials to provide the subsequent next modular product according to the next plurality of inputs and the next one or more inputs.

* * * * *